United States Patent

Malifaud

[15] 3,676,667

[45] July 11, 1972

[54] OPTICAL PROJECTOR DEVICE

[72] Inventor: Pierre Malifaud, 95, boulevard Jourdan, Paris 14e, France

[22] Filed: July 18, 1969

[21] Appl. No.: 842,883

[30] Foreign Application Priority Data

July 19, 1968 France ................................. 68159972

[52] U.S. Cl. ..................................................... 240/41.35 R
[51] Int. Cl. ........................................................ F21u 13/04
[58] Field of Search ................. 240/41.35, 41.35 A, 41.35 B, 240/41.35 C, 41.35 E, 41.3, 41, 41.55, 46.53, 41.15, 93, 103, 104; 350/293, 294, 299, 288, 96 T; 352/198; 353/99

[56] References Cited

UNITED STATES PATENTS

| | | | |
|---|---|---|---|
| 2,945,958 | 7/1960 | Morris | 350/288 |
| 3,318,184 | 5/1967 | Jackson | 352/198 X |
| 1,804,651 | 5/1931 | Shipman | 240/103 |
| 1,891,846 | 12/1932 | Stauber | 240/46.53 |
| 2,584,697 | 2/1952 | Gunther | 240/41.35 X |
| 2,689,908 | 9/1954 | Simmonds | 240/46.53 X |
| 3,152,765 | 10/1964 | Wohlers | 240/41.35 X |
| 3,383,540 | 5/1968 | Walters | 240/41.35 |
| 3,437,804 | 4/1969 | Schaefer et al. | 240/41.35 |

Primary Examiner—Richard C. Queisser
Assistant Examiner—C. E. Snee, III
Attorney—Bacon & Thomas

[57] ABSTRACT

An optical projector device in which light is collected from substantially $4\pi$ steradians by means of two reflector systems. One system comprises a tapering reflector, and the other system can include planar tapered, spherical, ellipsoidal, or cylindrical reflector elements which reflect light from the remaining solid angle towards the entrance window of the first system. The tapering reflector may have the general shape of a truncated cone, prism, or pyramid.

9 Claims, 19 Drawing Figures

INVENTOR
PIERRE MALIFAUD
BY
Bacon & Thomas
ATTORNEYS

OPTICAL PROJECTOR DEVICE

BACKGROUND OF THE INVENTION

The present invention relates to an optical projector device of the kind constituted by a radiation source associated with a reflective collecting optical system.

The basic problem of cinema projection technique, and indeed of directional lighting in general, consists in transferring to a screen or to an object, the largest possible proportion of the luminuous flux emitted by a radiation source, preferably at the same time distributing it in the most uniform possible manner. Hitherto, to this end either refractive optical systems have been used (like the aspherical lenses and condensers used in many cinematographic projectors, or the Fresnel lenses used in marine beacons, in theater spotlamps, in lighting applications in museums, in relation to monuments, in shop windows and so on), or parabolic mirrors (such as those employed in battery-operated torches and lamps, car headlamps, municipal lighting etc.).

In the case of refractive optical systems, the primary condition which must be satisfied in order to achieve an optimum result, is to capture the whole of the luminous flux emitted by the source, and this presumes an optical system with an aperture of F/0.5 in front of the source and a reflective collecting optical system behind it likewise with an aperture of F/0.5. However, the conventional optical systems which are available for location in front of the source, have an aperture which barely exceeds F/1 and in practice never exceeds a maximum of F/0.75. The flux which is picked up is proportional to the solid angle. At F/1, the ratio of the flux which is picked up to the flux emitted (within a half-space) is around 1:7.5. At F/0.75, this ratio is around 1:4. Using a spherical mirror located behind the source in such fashion that it produces a slightly offset image of the source, it is possible to recover approximately the same proportion of the flux emitted within the other half-space. Thus, theoretically, 13 percent of the total flux can be picked up at F/1 and up to 25 percent of the total at F/0.75. This takes no account of losses due to various aberration factors which are not negligible at these apertures. In practice, the net result is that using these means only 10 to 15 percent (at the most) of the emitted luminous flux is actually picked up. Obviously, this falls far short of the maximum.

In the case of parabolic mirrors, the source, located at the focus, is partly enveloped by the mirror. A substantial proportion of the flux is thus picked up. However, at the same time the coma aberration inherent in these mirrors, becomes such that part of the flux picked up is dispersed in a divergent beam which cannot be exploited. More often than not, it is virtually impossible to obtain more than an effective 15 or 20 percent of the flux emitted by the source.

To put it briefly, optical refractive systems, while having an acceptable efficiency in themselves, pick up very little of the emitted flux, whilst parabolic mirrors pick up more flux but inherently have a lower efficiency.

In addition, all these optical systems, which are of the inverted image kind, this applying equally to aspherical lenses associated with condensers (the latter with planoconvex lenses) and to parabolic mirrors, require the use of light sources which are as near as possible to the ideal point source. This means that the lamps used are expensive, fragile and have a relatively short operational life. These lamps are often operated at low voltage and this requires the use of heavy, bulky and expensive transformers.

SUMMARY OF THE INVENTION

The object of the present invention is to provide a solution to the problem of projection, which, on the one hand, exploits to the maximum possible extent the theoretical limits in terms of the magnitude of the projected flux and, on the other hand, achieves the most uniform possible light distribution, at the same time avoiding the various drawbacks hereinbefore listed.

One aspect of the present invention provides an optical projector device constituted by a radiation source associated with a reflective collecting optical system, characterized by a frusto-conical or conical or prismatic mirror, the small section of which, in combination with the reflective collecting optical system, optically surrounds the radiation source within a solid angle of $4\pi$ steradians.

Another aspect of the present invention provides an optical projector device comprising a source of optical radiation, first reflective means for concentrating the radiation from said source and having an entrance window which is disposed adjacent said source, and which subtends at said source a solid angle S, said first reflective means comprising at least one tapering reflective element which diverges from said entrance window towards an exit window, and second reflective means for collecting radiation from said source in a solid angle T excluding the solid angle S and reflecting the radiation collected into said entrance window.

Using the device in accordance with the invention, the whole of the flux emitted by the source can be picked up by the small input section of the frusto-conical or annular mirror and, since a tapered mirror employed in the manner indicated (capture of the flux by the small section and projection at the large section) is the only kind of optical system capable of picking up a radiated flux within a half-space and of projecting it at the output within a smaller solid angle, it is accordingly possible to produce an optical projector device of maximum efficiency. It is unnecessary to employ a "point" light source. All that is necessary is to adapt the small input section of the tapered mirror to the size of the source used.

The object of the present invention will be better understood from a consideration of the ensuing description of a variety of non-limitative examples, and from a consideration of the attached drawing in which:

FIG. 17 illustrates a perspective view of an embodiment employing four frusto-conical elementary mirrors.

FIG. 18 is a schematic view of a further modification of the invention; and

FIG. 19 is a schematic view of a still further modification of the invention.

Figure 1:
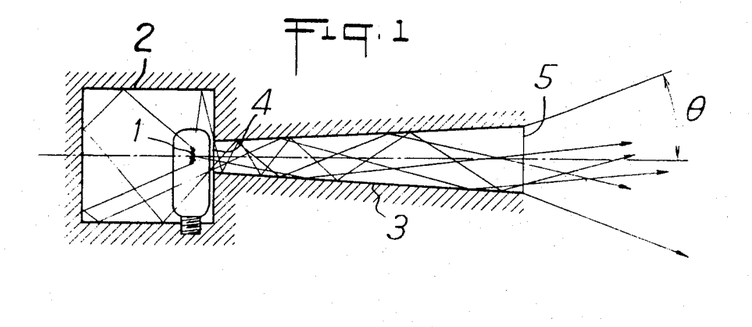
FIG. 1 is a schematic section showing the general design of the device in accordance with the invention.

As FIG. 1 illustrates, the optical projector device comprises a radiation source 1, such as an electric light bulb, located in a reflective collecting optical system 2 of arbitrary form, optically surrounding the source 1 jointly with a frusto-conical mirror 3, within a solid angle of $4\pi$ steradians. The small section 4 of said frusto-conical mirror 3, the area of which is at least equal to the total emissive area of the source 1, is located in the indicated example in such fashion as to coincide with an opening formed in the reflective collecting optical system 2. Using a device of this kind, the whole of the flux emitted by the source 1 is picked up either directly or, after a certain number of reflections, by the small section 4 of the frusto-conical mirror 3 and is directed by a series of internal reflections to the large exit section 5 of the mirror where the luminous flux takes the form of a beam with a mean apertural half-angle of $\theta_1$. It should be pointed out that the frusto-conical mirror 3 may be hollow or solid and may be constituted by an optically refractive material such as glass.

Figure 2:
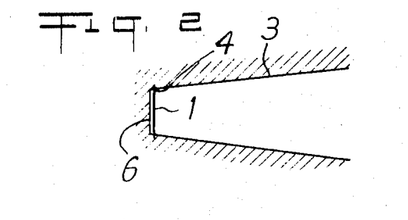
FIGS. 2 and 3 illustrate two embodiments of the device in accordance with the invention, which respectively employ as the reflective collecting optical system, a flat mirror and a flat mirror associated with a frusto-conical section of mirror.
Figure 4:
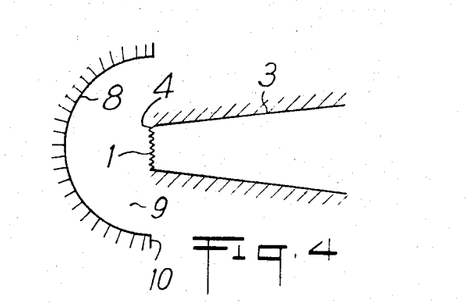
FIG. 4 illustrates an embodiment of the device in accordance with the invention in which the reflective collecting optical system is constituted by a hemispherical mirror.

In accordance with a first embodiment, the radiation source 1 is located substantially in the same plane as the small section of the frusto-conical mirror 3 (see FIGS. 2 and 4).

Figure 3:
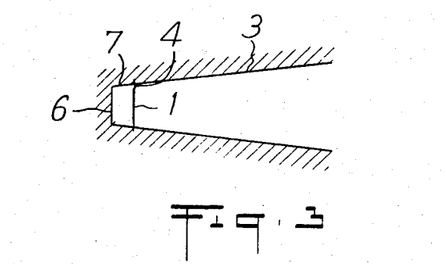

In FIGS. 2 and 3, it can be seen that the reflective collecting optical system is constituted by at least one flat mirror 6 attached to the small section 4 of the frusto-conical mirror 3. In the particular case illustrated in FIG. 2, the flat mirror 6 is located in the immediate vicinity of the small section 4 and is attached directly thereto. In the case of FIG. 3, the attachment of the flat mirror 6 is effected by means of a frusto-conical mirror 7 which constitutes the geometrical extension of the frusto-conical mirror 3.

In all cases where the radiation source is relatively bulky, it is advantageous to employ a reflective collecting optical system which is constituted by at least two flat mirrors inclined in Veed formation towards said source. In this fashion, some of the rays emitted by the source, which would otherwise be reflected back to it and thus absorbed by it in the case of a simple flat mirror, are instead deflected away from the source by the Veed mirrors and are thus effective in the projection function.

In this same context, it is equally possible to secure a still further improvement by using as the reflective collecting optical system, a mirror at least one meridian right section of which has the form of a development of the curve defining the corresponding meridian right section of the radiation source.

In the example of FIG. 4, the mirror of the reflective collecting optical system is concave and has the form of a hemisphere 8, the geometric center of which is located substantially on the center of the small section 4 of the frusto-conical mirror 3. Self-evidently, this mirror 8 could equally have a cylindrical form, exhibiting a semicircular medidian section. Such cylindrical mirror would be closed at its two extremities by, for example, flat mirrors disposed perpendicularly to the cylinder axis. This arrangement is particularly advantageous where the radiation source is itself of elongated form, the axis of the cylinder then coinciding substantially with that of the source.

In order to prevent re-absorption of light rays by the source, after reflection at the optical collector system, it is necessary to offset the center of the circular section of the collector mirror 8, in relation to the radiation source, in order that the image of the source which is produced by said mirror does not coincide with said source.

It should also be borne in mind that the reflective collecting optical system and frusto-conical mirror, do not necessarily physically surround the radiation source within a solid angle of $4\pi$ steradians, but only in an optical manner, that is to say in a manner such that any ray emitted by the source within a solid angle of $4\pi$ steradians will be incident upon the collecting mirror or upon the small section of the frusto-conical mirror. For reasons associated with air supply to and cooling of the source, it may be advantageous to create a free space 9 (see FIG. 4) between the periphery of the collecting mirror 8 and the small section 4 of the frusto-conical mirror 3.

Figure 5:
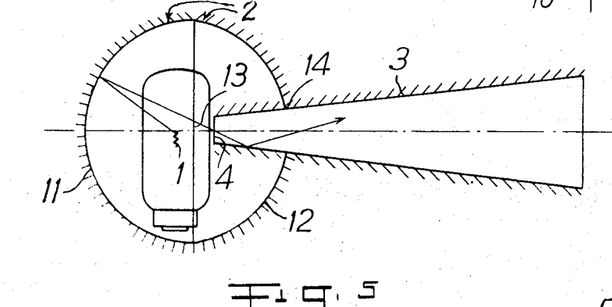
FIGS. 5 and 6 illustrate two other embodiments of the device in accordance with the invention, in which the reflective collecting optical system is constituted by the combination of two concave mirrors, the one being spherical or elliptical, and the other being spherical.

In accordance with another embodiment of the invention (FIG. 5) the reflective collecting optical system 2 is constituted by two spherical mirrors 11 and 12 with mutually oppositely directed convexities and located on the same optical axis as the associated frusto-conical mirror 3, one (11) of these concave mirrors having its geometric center 13 located at the center of the interval between the radiation source 1 and the small section 4 of the frusto-conical mirror 3, and the other collecting mirror 12, having its geometric center in the median plane of the source 1, and also exhibiting an opening 14 through which the frusto-conical mirror 3 passes.

Figure 6:
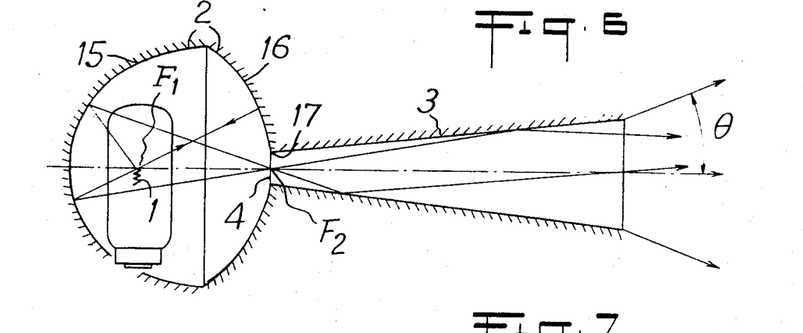

In accordance with the embodiment illustrated in FIG. 6, the two concave mirrors with their convex portions directed in opposite directions and having their optical axes coincidental with that of the frusto-conical mirror 3, these concave mirrors constituting the reflective collecting optical system 2, are incorporated in the one case (15) by an elliptical mirror the internal focus $F_1$ of which is located in the median plane of the radiation source and the other focus $F_2$ which is located at the center of the small section 4 of the frusto-conical mirror 3, and in the other case (16) by a spherical mirror the geometric center of which is located in the median plane of the radiation source and which contains an opening 17 surrounding the small section 4 of the frusto-conical mirror.

Self-evidently, as indicated hereinbefore and in particular where the source is of elongated form, the spherical or ellipsoidal collecting mirrors will advantageously be replaced by cylindrical mirrors of circular or elliptical right section, having their axes disposed substantially coincidentally with that of the source.

It is equally possible to provide a spherical mirror 16 the edge of which is not flush with that of the elliptical mirror 15 but is located in the same plane as the edge of the mirror 15 and externally thereof. In this case, the opening 17 in the spherical mirror 16 is offset towards the large section of the frusto-conical mirror 3, the small section 4 thereof then penetrating into the spherical mirror 16; the geometric center of said spherical mirror 16 is, of course, likewise situated in the median plane of the radiation source 1 and the focus $F_2$ of the elliptical mirror 15 is located at the center of the small section 4 of the frusto-conical mirror 3. Thus, the optical device in accordance with the invention can be cooled in a more convenient and efficient manner.

Figures 7, 8, 9:
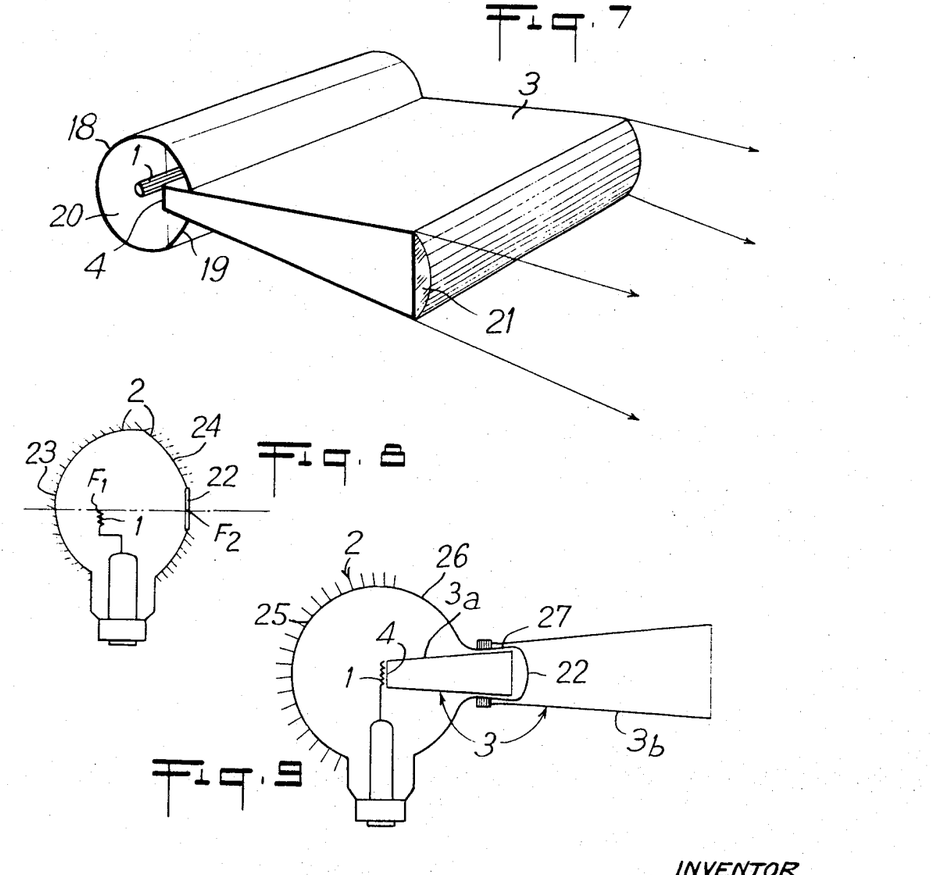
FIG. 7 illustrates a schematic perspective view of another embodiment, comprising an elongated radiation source.
FIGS. 8, 9 and 10 illustrate different embodiments of the device in accordance with the invention, in which at least part of the enclosure containing the radiation source, constitutes the reflective collecting optical system.

FIG. 7 illustrates an application of the optical device in accordance with the invention, to a lighting system producing bands of directed rays, an application for example in the context of car headlamps. In this case, the radiation source 1 is cylindrical in form and is constituted for example by the elongated tungstan filament coil of a halogen bulb; the reflective collecting optical system is constituted by two cylindrical mirrors 18, 19, the meridian sections of which have a shape and arrangement similar to that of the ones shown in FIG. 5. The mirror 3 here has a prismatic form, the smaller section 4 having a rectangular shape, picking up the image of the source 1 and penetrating into the mirror 19. The lateral faces of the cylindrical mirrors 18, 19 are closed by flat mirrors 20. The large section 5 of the prismatic mirror 3 likewise exhibits an elongated rectangular form. Thus, the bunch of rays projected across the large section 5, the latter here doing duty as a slot, exits from the latter in the form of a band of directed rays which illuminate the roadway in a slightly downward-inclined plane. The directivity of the rays prevents any dazzling of the drivers of oncoming vehicles. Additionally, the large section 5 of the prismatic mirror may be equipped with a slightly refractive optical element 21 in order to reduce the apertural angle of the beam.

Figures 10, 11, 12:
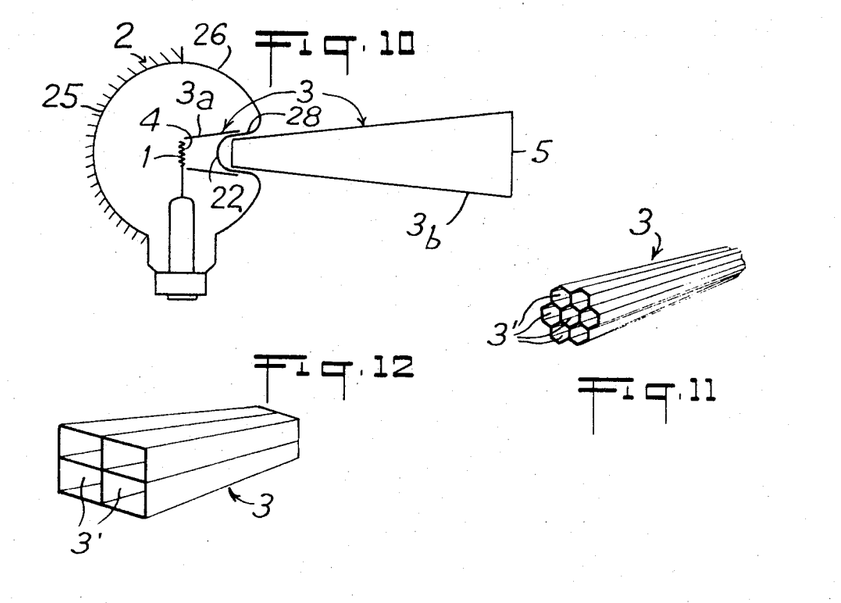
FIGS. 11 and 12 illustrate two methods of arranging several elementary frusto-conical mirrors to operate in parallel.

As FIGS. 8, 9 and 10 illustrate, the reflective collecting optical system 2 also constitutes the enclosure for the radiation source 1, which ensclosure is coated at least partially with a reflective layer and, in the zone associated with the frusto-conical mirror 3, exhibits a transparent portion 22.

In FIG. 8, the enclosure housing the source 1, the latter being for example an electric light bulb, is constituted by a glass bulb made up of an elliptical mirror 23 and a spherical mirror 24 with their convexities oppositely directed and having the same optical axis as the associated frusto-conical mirror. The rearward elliptical mirror 23 has its internal focus $F_1$ located in the median plane of the source 1 and its second focus $F_2$ located in the plane of the transparent portion or window 22 formed at the top of the forward, spherical mirror 24.

The geometric center of the mirror 24 is located in the median plane of the source 1, that is to say at the focus $F_1$ and also on the optical axis of the associated frusto-conical mirror (not shown). The area of the transparent window 22 is equal to the area of the small section of the frusto-conical mirror which is in contact with said window.

In the embodiments illustrated in FIGS. 9 and 10, the frusto-conical mirror 3 is split into two portions 3a and 3b, that comprising the small section 4 being located inside the enclosure containing the radiation source 1, and that comprising the large section 5 being located externally of said enclosure and being optically connected to the first part 3a of the frusto-conical mirror. The enclosure containing the source 1 comprises a single rearward hemispherical mirror 25 the geometric center of which coincides substantially with the center of the small section 4 of the frusto-conical mirror and with the radiation source, it being understood of course that the image of the source, formed by said mirror, is slightly offset in relation to the light-emitting part of said source. In these embodiments, the forward part 26 of the bulb is kept transparent since it does not perform any optical function.

In the example illustrated in FIG. 9, the forward part 26 of the bulb comprises an external bulbous projection 27 containing the window 22 and doing duty as the location for the forward extremity of the rearward part 3a of the frusto-conical mirror 3. In addition, this projection 27 does duty as a location for the fitting of the rearward extremity on the forward part 3b of the frusto-conical mirror 3.

In accordance with a variant embodiment which has not been shown in the drawing, the bulbous projection 27 is extended in the forward direction and coated laterally with a reflective deposit in order itself to do duty as the whole of the forward part 3b of the frusto-conical mirror 3.

In accordance with the example shown in FIG. 10, the forward part 26 of the bulb contains a depression or cavity 28 embraced by the forward extremity of the rearward part 3a of the frusto-conical mirror 3. In this depression, there is fitted externally, the rearward extremity of the forward part 3b of the frusto-conical mirror 3.

In addition, as FIGS. 11 and 12 show, the frusto-conical or conical or prismatic mirror, 3, may be constituted by a set of elementary mirrors 3' of the same form, operating in a parallel disposition. The elementary mirrors 3' will preferably take the form of pyramids contiguously disposed in relation to one another at their lateral faces and having bases of equilateral triangle form, square form or hexagonal form. These elementary mirrors 3' can likewise be constituted by conical optical fibers. Thanks to this parallel disposition of the elementary mirrors 3', it is possible to considerably reduce the total length of the overall frusto-conical mirror 3. In other words, the length of each elementary mirror is reduced in the proportion of the square root of the number of elementary mirrors.

In all instances where the zone to be illuminated has a well-defined contour, for example a transparency of given format arranged in a projector, it is advantageous to give the large, exit section 5 of the frusto-conical mirror 3, a contour which is homothetic in relation to the orthogonal projection of the contour of the illuminated zone onto a plane perpendicular to the axis of the illuminating beam. In this fashion, all the emitted flux is efficiently exploited since it is wholly directed onto the zone being illuminated.

In order, using the optical projector device in accordance with the invention, to achieve optimum results, it is advantageous to dimension the frusto-conical mirror 3 in accordance with the formulas listed hereinafter in respect of different general applications.

Figure 13:
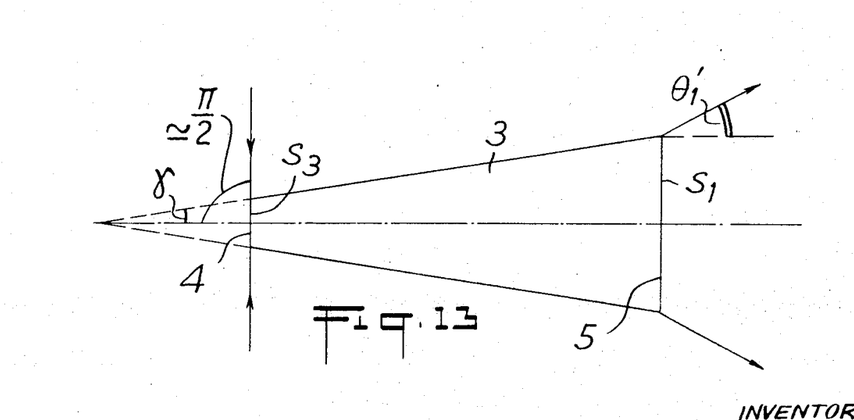
FIGS. 13 and 14 illustrate diagrams of the frusto-conical mirror, showing how it is optically dimensioned.

In a first case (FIG. 3) it is desired to produce perfectly uniform distribution of the luminous flux (Lambertian distribution) within the illuminated zone. In order to achieve this result, of the bunch of rays leaving the frusto-conical mirror 3 only the central part, defined within an angle the half-angle of which is marked here by $\theta_1$, should be used. The result is a loss of luminous flux which can be reduced to a given proportion $(1 - \eta)$ provided that the dimensions of the frusto-conical mirror 3 are determined in accordance with the following expressions:

$$\begin{cases} \dfrac{S_1}{S_2} = \left[ \dfrac{\cos \gamma}{\sin(\theta_1 + \gamma)} \right]^2 \\[2ex] \dfrac{1}{\left(1 + \tan \alpha \sqrt{\dfrac{1}{\sin^2 \theta_1} - 1}\right)^2} = \eta \end{cases}$$

where $S_1$ and $S_2$ are respectively the areas of the large and small sections of said mirror;

$\gamma$ is the mean half-angle of the apex of the mirror;

$\theta_1$ is the mean apertural half-angle of the bunch of rays leaving the large section of said mirror and producing uniform illumination; and $\eta$ is a predetermined ratio between the luminous flux transmitted in the bunch of rays exiting across the large section, and the luminous flux picked up by the small section of said mirror.

More often than not in practice, $S_2$ is known since it depends directly on the dimensions of the radiation source, $\theta_1$ likewise, being the desired half-angle in the illuminating beam, and also $(1 - \eta)$ which is the predetermined allowed proportion of flux loss. Thus, from the formulas the values of $S_1$ and $\gamma$ can be obtained and this enables the optimum frusto-conical mirror design to be produced, in order to give the desired result in the present case.

Figure 14:
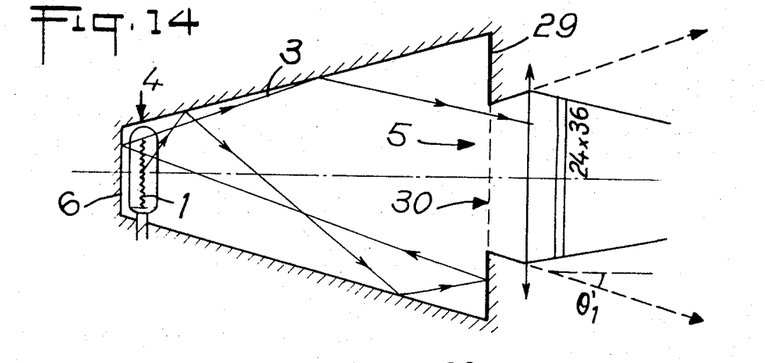

In the second case (FIG. 14), it is desired to transmit the luminous flux wholly to the illuminated zone. Accordingly, it is necessary, in addition to the central flux fraction with the Lambertian distribution, to accept a marginal, complementary flux fraction up to an apertural half-angle of $\theta'_1$ ($\theta'_1 > \theta_1$), in which the distribution is no longer uniform. The interval between the central illumination and the marginal or fringe illumination can be reduced by setting a predetermined value $\tau$ for the coefficient of uniformity of illumination, which value characterizes said interval, provided that the dimensions of the frusto-conical mirror 3 are determined in accordance with the following expressions:

$$\begin{cases} \dfrac{S_1}{S_3} = \left[ \dfrac{\cos \gamma}{\sin(\theta'_1 - \gamma)} \right]^2 \\[2ex] \left(1 - \tan \gamma \sqrt{\dfrac{1}{\sin^2 \theta'_1} - 1}\right)^2 = \tau \end{cases}$$

where $S_1$ and $S_3$ are the respective areas of the large and small sections of said mirror;

$\gamma$ is the mean half-angle of the mirror apex;

$\theta'_1$ is the mean apertural half-angle of the bunch of rays leaving the large section of said mirror and carrying the whole of the luminous flux picked up by the small section thereof; and $\tau$ is a predetermined valie of the coefficient of uniformity of illumination, which characterizes the ratio between the minimum illumination and maximum illumination produced by the bunch of rays coming from said mirror.

In a manner similar to that described in relation to the earlier case, $S_3$, $\theta'_1$ and $\tau$ are known right from the start, and are used to determine $S_1$ and $\gamma$.

In practice, it may happen that the value obtained for the area $S_1$ on the exit section 5 of the frusto-conical mirror 3, has to be made too large for other reasons. This may, for example, happen in the case of a transparency projector in which the format of the large exit section 5 is limited by the format of the transparency so that the section $S_1$ given by the formulas may be too large.

In accordance with the invention (see FIG. 15), this difficulty can be overcome by applying against the exit section 5 of area $S_1$ (the latter determined by the above formulas) a flat mirror 29 the reflective face of which is turned towards the interior of the frusto-conical mirror 3, a window 30 being cut in the central part of said flat mirror 29, which has dimensions appropriate to the external considerations referred to above. In this fashion, part of the flux arriving at the large section 5, around the window, is recovered, that is to say that ultimately, after a certain number of internal reflections, it passes across the window 30 so that the mean illumination level at the surface of said window is higher than the mean illumination level over the large area when the window is left out of consideration.

Figure 15:
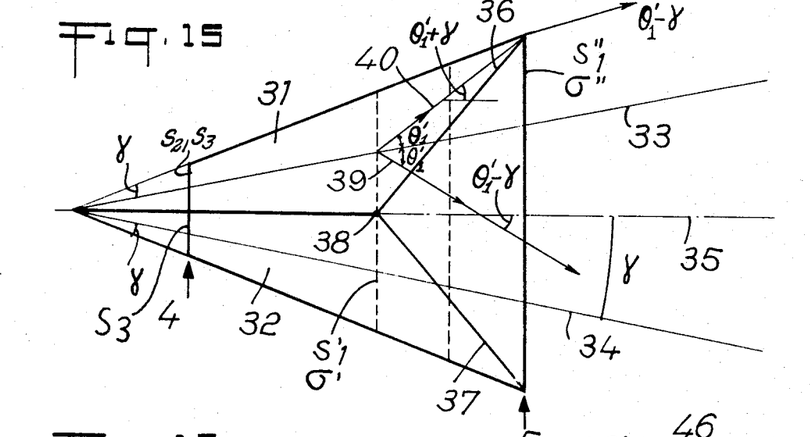
FIG. 15 illustrates a frusto-conical mirror comprising a flat frontal mirror containing a central opening.

In addition, this flat, windowed mirror can be used for another purpose: namely in order to reduce the apertural half-angle at the exiting beam, without increasing the length of the frusto-conical mirror, an artifice which may be relevant in particular in the case of a lighting projector and which can be implemented using a flat windowed mirror; in other words, the ratio $S_1/S_2$ or $S_1/S_3$ is then increased and the angles $\theta_1$ or $\theta'_1$ are reduced.

Figure 16:
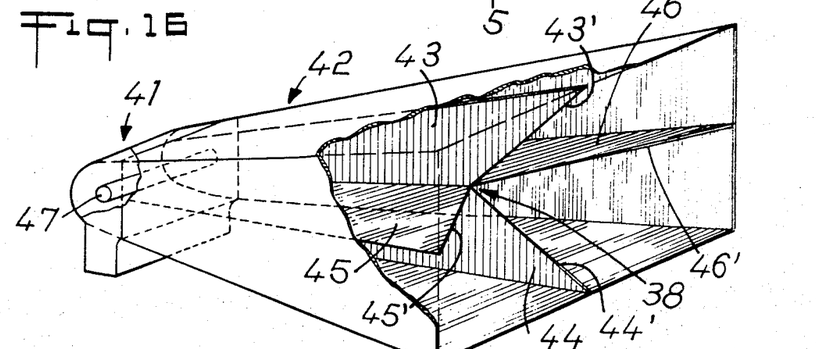
FIG. 16 illustrates a schematic section through two coupled elementary frusto-conical mirrors, the section illustrating how the optimum dimensions of their output sections are determined.

Finally, if several elementary frusto-conical, pyramidal or prismatic mirrors arranged contiguously at their lateral faces and operating in a parallel arrangement (see FIG. 16), are used, their optical axes will be inclined in relation to the general optical axis so that the total apertural half-angle of the overall beam leaving the arrangement of elementary mirrors, is increased. This is a drawback which can be overcome in accordance with the invention, by the following technique:

In FIG. 16, a vertical meridian section through two elementary pyramida; mirrors 31, 32 whose optical axes 33, 34 are inclined in relation to the general optical axis 35 through an angle equal to their apex half-angle $\gamma$, have been shown.

In accordance with the invention, the exit faces 36 and 37 of the elementary mirrors 31 and 32 of the overall exit section 5, are inclined towards the overall, smaller input section 4 and intersect on the optical axis 35 along a straight-line 38. Self-evidently, if more than two elementary mirrors are used, for example four, the intersection between the exit faces of these elementary mirrors will be reduced to a point.

The location of the straight-line or point of intersection or junction 38, on the general optical axis 35, is determined by formulas which will be set out hereinafter.

In a general fashion, all the exit faces of the elementary mirrors join the general optical axis inside the overall mirror constituted by the assembly of elementary mirrors, and the peripheral zones of these exit faces are joined to the corresponding lateral faces of the homologous elementary mirrors in a right section the diameter of which is larger than that of the section of the junction between all the exit faces.

In this fashion, a ray such as the one 39, considered from a point located in the vertical plane passing through the junction point 38, and inclined downwards through an angle $\theta$ in relation to the optical axis 33 of the elementary frusto-conical mirror 31, so that it makes an angle of $(\theta - \gamma)$ with the general optical axis 35, can leave the frusto-conical mirror quite freely since the influence of the inclination of the axis 33 in relation to the axis 35, is amenable to this.

On the other hand, a ray such as the one 40, leaving the same point as the ray 39 but inclined upwards through an angle $\theta$ in relation to the optical axis 33, will make an angle of $(\theta + \gamma)$ in relation to the general optical axis 35. It is therefore desirable to cause this ray 40 to experience supplementary reflection in the elementary mirror 31 in order to deflect it through an angle of $2\gamma$, so that at exit its inclination in relation to the general optical axis 35 is $(\theta - \gamma)$.

In a first case, corresponding to the requirement for perfectly uniform lighting hereinbefore mentioned in relation to FIG. 13, the right section of the junction between all the exit faces of the elementary mirrors, is determined in accordance with the following expressions:

$$\left\{ \begin{array}{l} \dfrac{S'_1}{S_2} = \left[ \dfrac{\cos \gamma}{\sin(\theta_1 + 2\gamma)} \right]^2 \\[2ex] \dfrac{1}{\left(1 + \tan \gamma \sqrt{\dfrac{1}{\sin^2(\theta_1 + \gamma)} - 1'}\right)^2} = \eta \end{array} \right.$$

where $S'_1$ and $S_2$ are the respective areas of the right junction section referred to above, and of the small section of the overall assembly of elementary mirrors;

$\gamma$ is the mean apex half-angle of each of the elementary mirrors;

the value $(\theta_1 + \gamma)$ is that of the mean apertural half-angle of the bunch of rays leaving at the aforementioned right junction section; and $\eta$ is a predetermined ratio between the luminous flux transmitted by the bunch of rays leaving the junction section, and the luminous flux picked up by the small section.

In the same instance, it may be advantageous to determine the right section in which the peripheral zones of the exit faces join the corresponding lateral faces of the elementary mirrors, in accordance with the following expressions:

$$\left\{ \begin{array}{l} \dfrac{S''_1}{S_2} \left( \dfrac{\cos \gamma}{\sin \theta_1} \right)^2 \\[2ex] \dfrac{1'}{\left(1 + \tan \gamma \sqrt{\dfrac{1}{\sin^2(\theta_1 - \gamma)} - 1'}\right)^{2'}} = \eta' \end{array} \right.$$

where $S''_1$ and $S_2$ are the respective areas of the right section in which the peripheral zones of the exit faces join the corresponding lateral faces of the elementary mirrors, and the small section of the overall arrangement of all the elementary mirrors; $\gamma$ is the mean apex half-angle of each of the elementary mirrors; the value $(\theta_1 - \gamma)$ is that of the mean apertural half-angle of the bunch of rays leaving the aforementioned right section; and $\eta'$ is a predetermined ratio between the luminous flux transmitted by the bunch of rays leaving saud right section, and the luminous flux picked up by the small section.

In a second case, namely that in which it is required to retain the whole of the luminous flux picked up, this already having been mentioned in connection with FIG. 14, the right section of the junction of all the exit faces of the elementary mirrors is determined by the following dimensional relationships:

$$\left\{ \begin{array}{l} \dfrac{\delta'}{S_3} = \left( \dfrac{\cos}{\sin \theta'_1} \right)^2 \\[2ex] \left(1 - \tan \gamma \sqrt{\dfrac{1}{\sin^2(\theta'_1 + \gamma)} - 1}\right)^2 = \tau \end{array} \right.$$

δ' and S₃ respectively indicate the areas of the above-mentioned right section at the junction, and the small section of the assembly of all the elementary mirrors;

γ is the mean apex half-angle of each of the elementary mirrors;

the factor $(\theta'_1 + \gamma)$ is the mean apertural half-angle of the bunch of rays exiting at the right junction section; and τ is a predetermined uniformity coefficient describing the ratio between the minimum and maximum illumination levels produced by the bunch of rays exiting at said junction section.

In this same case, it may be advantageous to determine the right section in which the peripheral zones of the exit faces join the corresponding lateral faces of the elementary mirrors, in accordance with the following dimensional relationships:

$$\begin{cases} \dfrac{\delta''}{S_3} = \left[ \dfrac{\cos \gamma}{\sin (\theta'_1 - 2\gamma)} \right]^2 \\ \left( 1 - \tan \gamma \sqrt{\dfrac{1}{\sin^2 (\theta'_1 - \gamma)} - 1} \right)^2 = \tau' \end{cases}$$

where ι'' and S₃ and the respective areas of the right section in which the peripheral zones of the exit faces join the corresponding lateral faces of the elementary mirrors, and the small section of the overall arrangement of elementary mirrors;

γ is the mean apex half-angle of each of the elementary mirrors;

the factor $(\theta'_1 - \gamma)$ is the mean apertural half-angle of the bunch of rays exiting at the above-mentioned right section; and τ' is a predetermined value of the uniformity coefficient describing the ratio between the minimum and the maximum illumination levels produced by the bunch of rays exiting at the said junction section.

In FIG. 17, an optical projector device can be seen which is designed, for example, for directional illumination, this device comprising in front of the reflective collecting optical system 41, a mirror of the frusto-conical type, 42, here of pyramidal form, within which flat mirrors 43, 44, 45, 46 mounted in a criss-cross arrangement and delimiting four elementary mirrors in relation to the internal faces of the pyramidal mirror 42, are arranged. The frontal ridges 43', 44', 45' and 46' of these flat mirrors are inclined towards the interior of the overall assembly of the pyramidal mirror, and join at a point 38 determined by one of the methods explained above.

The reflective collecting optical system 41 can advantageously be constituted by the enclosure for a special bulb the luminous element 47 of which is of elongated form and the position of which is offset in relation to the general optical axis in order, in cooperation with an appropriate form on the part of the rear collecting mirror, to avoid any re-absorption of radiation by said illuminating element.

What is claimed is:

1. Optical projector device adapted to give a projected flux with optimal yield and distribution of light and comprising a source of radiation, a reflective collecting optical system of concave type disposed about the source of radiation, and a tapered optical tunnel with internal reflecting sides tapered so as to cause divergence of an incident beam whose small section, known as input section, completes, in combination with said collecting optical system, total optical encompassment of said source, wherein said tapered mirror is designed in accordance with the following dimensional relationships:

$$\begin{cases} \dfrac{S_1}{S_3} = \left[ \dfrac{\cos \gamma}{\sin (\theta'_1 - \gamma)} \right]^2 \\ \tau = \left( 1 - \tan \gamma \sqrt{\dfrac{1}{\sin^2 \theta'_1} - 1} \right)^2 \end{cases}$$

wherein S₁ and S₃ are respective areas of the large and small sections of said tapered mirror and where S₃ is given and depends directly on the dimension of said source of radiation or on its image;

γ is the mean apex half-angle of said mirror;

$\theta'_1$ is the given mean apertural angle of the bunch of rays exiting at the large section of said mirror and transmitting the whole of the flux picked up at the small section of the mirror; and τ is a predetermined value of the coefficient of uniformity of illumination describing the ratio produced by the bunch of rays coming from said mirror.

2. Optical projector device as claimed in claim 1 wherein the tapered mirror is constituted by a bunch of tapered elementary mirrors whose axes are inclined in relation to the general optical axis, in such a fashion that all the exit faces inside the overall mirror constituted by the assembly of said elementary mirrors and wherein the peripheral zones of said exit faces join the corresponding lateral faces of the homologous elementary mirrors in a right section the average radial extension of which is larger than that of the right section in which is located the junction point between all the exit faces.

3. Optical projector device as claimed in claim 2 wherein the right section in which the peripheral zones of the exit faces join the corresponding lateral faces of the tapered elementary mirrors is determined by the following dimensional relationships:

$$\begin{cases} \dfrac{\delta''}{S_3} = \left[ \dfrac{\cos \gamma}{\sin (\theta'_1 - 2\gamma)} \right]^2 \\ \tau = \left( 1 - \tan \gamma \sqrt{\dfrac{1}{\sin^2 \theta'_1 - \gamma)} - 1} \right)^2 \end{cases}$$

where δ'' and S₃ are the respective areas of the right section in which the peripheral zones of the exit faces join the corresponding lateral faces of the elementary mirrors, and the small section of the overall mirror constituted by the assembly of all said elementary mirrors;

γ is the mean apex half-angle of each of the elementary mirrors;

the valve $(\theta'_1 - \gamma)$ is the mean apertural half-angle of the bunch of rays exiting at the aforementioned right section; and τ is a predetermined value of the uniformity coefficient, describing the ratio between the minimum and maximum illumination levels produced by the bunch of rays exiting at said junction section.

4. Optical projector device as claimed in claim 2, wherein the right section in which is located the junction point between all the exit faces of the tapered elementary mirrors is determined by the following relationships:

$$\begin{cases} \dfrac{\delta'}{S_3} = \left[ \dfrac{\cos \gamma}{\sin \theta'_1} \right]^2 \\ \tau = \left( 1 - \tan \gamma \sqrt{\dfrac{1}{\sin (\theta'_1 + \gamma)} - 1} \right)^2 \end{cases}$$

where $\iota'$ and $S_3$ are the respective areas of the right section aforementioned, and the small section of the overall mirror constituted by the assembly of all said elementary mirrors;

$\gamma$ is the mean apex half-angle of each of the elementary mirrors;

the value $(\theta'_1 + \gamma)$ is the mean apertural half-angle of the bunch of rays exiting at the right junction section; and $\tau$ is a predetermined value of the coefficient of uniformity, describing the ratio between the minimum and maximum illumination levels produced by the bunch of rays exiting at said right section in which is located the junction point between all the exit faces.

5. Optical projector device as claimed in claim 2, wherein the right section in which the peripheral zones of the exit faces join the corresponding lateral faces of the tapered elementary mirrors is determined by the following dimensional relationships:

$$\begin{cases} \dfrac{S''_1}{S_2} = \left[\dfrac{\cos \gamma}{\sin \theta'_1}\right]^2 \\ \\ \eta = \dfrac{1}{\left(1 + \tan \gamma \sqrt{\dfrac{1}{\sin^2(\theta'_1 - \gamma)}}\right)^2} \end{cases}$$

wherein $S''_1$ and $S_2$ are the respective areas of the right section in which the peripheral zones of the exit faces join the corresponding lateral faces of the elementary mirrors, and the small section of the overall mirror constituted by the assembly of all said elementary mirrors;

$\gamma$ is the mean apex half-angle of each of the elementary mirrors;

the value $(\theta'_1 - \gamma)$ is the mean apertural half-angle of the bunch of rays exiting at the aforementioned right section; and $\eta$ is a predetermined ratio between the luminous flux transmitted by the bunch of rays exiting at said right section, and the luminous flux picked up at the small section.

6. Optical projector device as claimed in claim 5, wherein the right section in which is situated the junction point of all the exit faces of the tapered elementary mirrors is determined by the following dimensional relationships:

$$\begin{cases} \dfrac{S'_1}{S_2} = \left[\dfrac{\cos \gamma}{\sin(\theta'_1 + 2\gamma)}\right]^2 \\ \\ \eta = \dfrac{1}{\left(1 + \tan \gamma \sqrt{\dfrac{1}{\sin^2(\theta'_1 + \gamma)} - 1}\right)^2} \end{cases}$$

where $S'_1$ and $S_2$ are the respective areas of the right junction section in which is situated the aforementioned junction point, and the small section of the overall mirror constituted by the assembly of all said elementary mirrors; and where $S_2$ is given and depends directly on the dimension of the radiation source or on its image;

$\gamma$ is the mean apex half-angle of each of the elementary mirrors;

the factor $(\theta'_1 - \gamma)$ is the mean apertural half-angle of the bunch of rays exiting at the aforesaid right junction section; and $\eta$ is a predetermined ratio between the luminous flux section and the luminous flux picked up at the small section.

7. Optical projector device as claimed in claim 1, wherein the large section of the tapered mirror has a contour which is homothetic in relation to the orthogonal projection of the contour of the zone which is to be illuminated, onto a plane perpendicular to the axis of the illuminating beam.

8. Optical projector device as claimed in 1, wherein at least the part of the tapered mirror and the emissive element of the radiation source are located in the same enclosure constituted by the selfsame enclosure of the radiation source.

9. Optical projector device as claimed in claim 8, wherein the tapered mirror is sub-divided into two sections, that containing the small section being situated inside the selfsame enclosure which contains the radiation source, and that containing the large section being situated externally of said enclosure and being optically connected to the first portion of said tapered mirror.

* * * * *